(12) United States Patent
Dongare et al.

(10) Patent No.: US 6,991,678 B2
(45) Date of Patent: Jan. 31, 2006

(54) PROCESS FOR PREPARING MICROPOROUS CRYSTALLINE TITANIUM SILICATE

(75) Inventors: Mohan Keraba Dongare, Pune (IN); Pratap Tukaram Patil, Pune (IN); Kusum Madhukar Malshe, Pune (IN)

(73) Assignee: Council of Scientific and Industrial Research, Rafi Marg (IN)

( * ) Notice: Subject to any disclaimer, the term of this patent is extended or adjusted under 35 U.S.C. 154(b) by 0 days.

(21) Appl. No.: 10/449,716

(22) Filed: May 30, 2003

(65) Prior Publication Data

US 2004/0024075 A1  Feb. 5, 2004

(30) Foreign Application Priority Data

Jul. 31, 2002  (IN) .................................... 791/02

(51) Int. Cl.
*C01B 37/00*  (2006.01)
*C01G 23/00*  (2006.01)
(52) U.S. Cl. .................... 106/446; 423/69; 423/85; 423/710; 423/711; 423/712; 521/63; 521/154
(58) Field of Classification Search ............... 106/446; 423/69, 710, 711, 712, 85; 521/63, 154
See application file for complete search history.

(56) References Cited

OTHER PUBLICATIONS

Sabde. Dhananjay P., et al., "Synthesis of titanium silicalite-1 using silicate-40: a new silica source for zeolite synthesis", *Journal of Materials Chemistry* (2000), 10(6), 1365-1370.
*Chemical Abstracts Service*, Columbus, Ohio, database accession No. 134:62163 CA XP002260170 Wang, Yajun, et al., "Synthesis of TS-1 zeolite with microporous/macroporous structure", Oct. 2000.
*Chemical Abstracts Service*, Columbus, Ohio, database accessing No. 138:75590 CA, Chang, S., et al., "Synthesis of silicalite -1 molecular sieve", CN Patent 1,338427A, Mar. 2002.

*Primary Examiner*—James J. Seidleck
*Assistant Examiner*—Irina S. Zemel
(74) *Attorney, Agent, or Firm*—Ladas & Parry

(57) ABSTRACT

A process for the preparation of crystalline microporous titanium silicates using ethylsilicate-40 and titanium peroxide as silicon and titanium sources respectively is described. The process permits a significant decrease in the production cost of titanium silicate containing higher amount of titanium (Si/Ti=20) because of cheaper raw materials as well as reduction in the quantity of tetarpropylammonium hydroxide (TPAOH) template ($SiO_2$:TPAOH=1:0.06–0.1) required for preparation. The material obtained by the present invention is useful as an active catalyst in the reactions such as oxidation of hydrocarbons, alcohols, sulphides, and thioethers.

9 Claims, No Drawings

PROCESS FOR PREPARING MICROPOROUS CRYSTALLINE TITANIUM SILICATE

FIELD OF THE INVENTION

The present invention relates to a process for preparation of crystalline microporous titanium silicates. More specifically the present invention relates to an improved process for the preparation of titanium silicate with crystal structure of silicalite-1. More particularly the present invention relates to the preparation of titanium silicate by using ethyl silicalite-40 and titanium peroxide as silicon and titanium sources and tetrapropyl ammonium hydroxide as template.

The present invention also relates to the preparation of titanium silicates by adding sequence of clear titanium peroxide solution to ethyl silicate-40 to obtain a homogeneous reactive gel which is further hydrolyzed with a very low amount of tetrapropyl ammonium hydroxide (TPAOH) as template without any use of organic solvent for preparation of the starting gel and keeping it for hydrothermal synthesis.

By the process of present invention, titanium silicate with a higher titanium content (Si/Ti=20) of comparable catalytic activity with conventional TS-1 catalyst has been prepared at a considerably lower cost because of cheaper silicon source as well as low TPAOH template requirement. The material obtained by the present invention is useful as an active catalyst in the reactions such as;
1) Oxidation of hydrocarbons or derivatives of hydrocarbons such as benzene to phenol, oxidation of phenol to hydroquinone and catechol
2) conversion of cyclohexanone to cyclohexanone oxime
3) conversion of ethanol into acetaldehyde
4) isopropanol to acetone etc.

BACKGROUND OF THE INVENTION

In the prior art, UK patent GB 2071071 describes a process for the preparation of titanium containing silicalite-1 designated as TS-1. The procedure involved in this process is to mix silicon source (preferably silicon tetraethoxide), titanium source (titanium tetraethoxide), organic base (tetrapropyl ammonium hydroxide) and water. The mixture is further heated hydro thermally to obtain microporous material with silicalite-1 structure. Due to difference in the rate of hydrolysis of silicon tetraethoxide and titanium tetraethoxide, formation of sparingly soluble titanium oxide ($TiO_2$) before the formation of titanosilicate, binders the incorporation of titanium in the tetrahedral framework leading to a titanium-depleted material. Also in the prior art, the chemical composition of such titanium silica (TS-1) has been claimed to be $xTiO_2:(1-x) SiO_2$ wherein x is in the range of 0.0001 to 0.04. The material has found applications in various oxidation reactions such as the conversion of benzene into phenol, phenol into hydroquinone and catechol, cyclohexanone into cyclohexanone oxime, ethanol into acetaldehyde, isopropanol into acetone, benzyl alcohol into benzaldehyde and benzoic acid etc. To overcome this limitation the silicon and titanium sources are hydrolyzed completely with organic base before mixing to obtain a clear liquid reaction mitre, which results in the titanium rich crystalline material.

U.S. Pat. No. 4,410,501 describes a process for the preparation of titanium silicalite-1 (TS-1). The samples were prepared by hydrothermal crystallization of precursor gel containing. tetraethyl orthosilicate Si $(OEt)_4$ or silica sol (Ludox AS 40) as a silicon source and tetraethyl orthotitanate Ti $(OEt)_4$ as titanium source. The preparation requires first mixing of Ti $(OEt)_4$ in silica source at low temperature (5° C.) followed by the addition of tetrapropyl ammonium hydroxide (TPAOH) solution to perform hydrolysis of the alkoxides. The micrporous crystalline product had the silicalite-1 structure with chemical composition $xTiO_2$ (1×x) $SiO_2$ where x lies between 0.0005 and 0.04. The patent also describes the use of titanium peroxide as titanium source. Tetraethyl titanium is hydrolyzed to obtain white gelatinous suspension, which was cooled at 5° C. and 30% hydrogen peroxide was added to the cooled suspension to obtain orange colored solution of titanium peroxide At this point 25% aqueous tetrapropyl ammonium hydroxide was added at 5° C. After one hour, Ludox colloidal silica, containing 40% of $SiO_2$ was added and the gel was heated in an autoclave at 175° C. for ten days to obtain crystalline TS-1 product. The main drawback in this procedure is the addition of tetrapropyl ammonium hydroxide to titanium peroxide solution, which will decompose the titanium peroxide to titanium oxide/hydroxide, which will hinder the incorporation of titanium into silicalite framework structure yielding low titanium containing TS-1 product with lower catalytic activity. The reactive titanium peroxide species used for the synthesis of TS-1 with high titanium content are destroyed by the addition of TPAOH to titanium peroxide as titanium peroxide is not stable in alkaline medium.

Another process for the preparation (A. Thangiraj, M. J. Eapen, S. Sivasanker and P. Ratnasamy, Zeolites, 12 (1992) 943) involves the complete hydrolysis of silicon tetraethoxide with organic base to obtain clear liquid to which titanium butoxide was added as a titanium source. By this process the titanium containing silicalite-1 was obtained with the chemical composition claimed to be $xTiO_2$ (1−x) $SiO_2$ wherein x is in the range 0.04–0.2. Such titanium rich silicas are found more active in the catalytic conversion of phenol to catechol and hydroquinone as compared to the TS-1 mentioned in the UK patent.

Another process for the preparation of titanium silicalite (A. Thel, Y. Ben Taarit. Applied Catalysis A: General 110, 1994, 137–151) is described using various silicon and titanium alkoxides. Silicon propoxide and silicon butonide whose rate of hydrolysis are very low leading to the formation of poorly crystalline material, containing extra framework species at very low titanium content. No significant influence of the titanium source was observed using silicon ethoxide as silicon source. However h higher titanium incorporation was obtained with silicon methoxide without formation of extra framework species.

In all the above applications, it has been found that catalytic efficiency of TS-1 is directly proportional to the content of titanium in titanium silicalite (TS-1).

The process for the preparation of TS-1 with enhanced catalytic activity and having the chemical formula $xTiO_2$: (1×x) $SiO_2$ wherein x greater than 0.04 and less than or equal to 0.075 described in U.S. Pat. No. 5,885,546 involves the use of acetylacetone forming a soluble complexing agent with titanium source.

In all prior art, efficient incorporation of titanium in silicalite framework i.e, the formation of Si—O—Ti bonds occurs only when it is formed during the reactive gel formation. It is possible only if the rate of hydrolysis of titanium alkoxide matches with that of silicon alkoxide, or silicon alkoxide is first hydrolyzed to obtain polymerized $Q^1$, $Q^2$, $Q^3$ species of Si—OH groups, before titanium alkoxide is added and hydrolyzed in-situ to facilitate Si—O—Ti bonds for this purpose, silicon ethoxide or preferably silicon methoxide should be used. Due to special techniques required for the preparation, higher cost of silicon tetramethoxide/silicon tetraethoxide as well as requirement of higher amount TPAOH as template increases the cost of titanium containing silicalite-1 which is major bottleneck for its commercial utilization.

Copending application No. 3514/DFL/1997 of the applicants discloses a process for preparation of titanium containing silicalite-1 using ethylsilicate-40 and butyl titanate as silicon source and titanium source respectively in isopropyl alcohol and simultaneous hydrolysis using tetrapropyl ammonium hydroxide.

OBJECTS OF THE INVENTION

The main object of the present invention is to provide an improved process for the preparation of titanium silicates, which is titanium rich as well as has comparable catalytic activity and which is also highly cost effective.

SUMMARY OF THE INVENTION

Accordingly, the present invention provides a process for preparation of microporous, crystalline titanium silicate having a silicalite-1 structure and a chemical composition of formula $xTiO_2:(1-x) SiO_2$ wherein x is in the range of 0.001 to 0.05, which comprises:
  a) adding a titanium source to ethyl silicate with or without an organic solvent to obtain a homogenous gel,
  b) hydrolyzing the homogeneous gel obtained in step (a) by adding an organic base to the above said resultant gel with silica to organic base ratio in the range of 1:0.06 to 0.15 followed by adding deionised water when yellow white gel turns into greenish white gel,
  c) stirring the above greenish white gel for about 1 hr,
  d) heating the stirred greenish white gel at autogenous pressure, at a temperature in the range of 100 to 180° C. for a period of 1–4 days to obtain a solid composite material,
  e) separating the resultant solid composite material, drying and calcining the resultant solid composite material at a temperature in the range of 350–550° C. in the presence of air to obtain the desired product.

In one embodiment of the invention, the titanium source comprises a solution of titanium peroxide.

In another embodiment of the invention, the organic base comprises aqueous tetrapropyl ammonium hydroxide (TPAOH).

In an embodiment of the present invention the ethyl silicate used is a source of silicon oxide.

In an another embodiment the ethyl silicate used is ethyl silicate 40.

In yet another embodiment the ethyl silicate 40 used is a condensed product of orthosilicate selected from the group consisting of tetramer, pentamer and hexamer.

In yet another embodiment the organic solvent used is an alcohol with 2 to 5 carbon atoms.

In another embodiment of the invention, the alcohol is selected from the group consisting of ethyl, propyl and butyl.

In yet another embodiment the silica to TPAOH ratio used is preferably 1:0.1.

In yet another embodiment the starting mixture has a chemical molar composition of $0.0.6-1 R_4N^+OH: 0.001-0.05 TiO_2:SiO_2:25-55 H_2O$ where R is a propyl group.

DETAILED DESCRIPTION OF THE INVENTION

The present invention provides a cost effective process for the preparation of microporous, crystalline titanium silicate with silicalite-1 structure which comprises forming a gel by addition of clear solution of a titanium source to a silicon source, stirring the mixture, addition of a template and water, again stirring the resultant gel, heating the resultant gel at autogenous pressure to a temperature between 100 to 180° C. for 1–4 days; cooling the reaction mixture, separating the product by conventional methods, washing, drying and calcining the resultant solid composite material at a temperature in the range of 350–550° C. in the presence of air. The final anhydrous titanium silicate of the present invention has the composition as:

$xTiO_2:(1-x) SiO_2$ where x is in the range of 0.001 and 0.05.

In the present invention, titanium peroxide, a water soluble source of titanium is used as titanium source in the preparation of titanium silicate, which forms Si—O—Ti linkages in the gel after increasing the pH of the gel using tetrapropyl ammonium hydroxide template.

The crystalline material of this invention can be characterized by x-ray powder diffraction (XRD), infrared spectroscopic (IR) and scow electron microscopic (SEM) examination. Corresponding XRD data for pure silicalite-1 are shown in Table 1

TABLE 1

| TITANIUM SILICATE | | SILICALITE-1 | |
|---|---|---|---|
| $2\theta^a$ | R.I[b] | $2\theta^a$ | R.I[b] |
| 7.90 | S | 7.94 | Vs |
| 8.70 | Ms | 8.80 | S |
| 13.89 | Mw | 13.95 | Mw |
| 14.75 | Mw | 14.78 | Mw |
| 15.48 | Mw | 15.52 | W |
| 15.90 | Mw | 15.92 | Mw |
| 20.81 | Mw | 20.87 | Mw |
| 23.09 | Vs | 23.12 | Vs |
| 23.90 | S | 23.96 | M |
| 24.37 | Ms | 24.34 | Mw |
| 25.77 | W | 25.75 | W |
| 26.58 | W | 26.70 | W |
| 29.91 | Mw | 29.94 | Mw |
| 45.10 | Mw | 45.12 | Mw |
| 45.51 | Mw | 45.6 | Mw |

[a]the 2θ values may vary by ± 0.05°
[b]R.I: Relative Intensity, vs: very strong, s: strong, m medium, w: weak.

The most significant lines of the x-ray powder diffraction of the titanium silicate taken on a Rigaku, Miniflex model, with Ni filtered Cu $K_\alpha$ radiation along with the Silicalite-1 is more fully described by Flanigen E. M. and others in the Journal Nature, 271, 512 (1978). The FTIR spectra in KBr matrix were scanned on Nicholet 60SXB spectrometer. A characteristic IR absorption band at about 958 $cm^{-1}$, which is assigned to the tin in the tetrahedral framework of silicate samples is shown in table 2.

TABLE 2

| TITANIUM SILICATE | | SILICALITE-1 | |
|---|---|---|---|
| $Cm^{-1}$ | R.I.[a] | $cm^{-1}$ | R.I.[a] |
| 462 | S | 465 | S |
| 552 | Ms | 555 | ms |

TABLE 2-continued

| TITANIUM SILICATE | | SILICALITE-1 | |
|---|---|---|---|
| Cm$^{-1}$ | R.I.[a] | cm$^{-1}$ | R.I.[a] |
| 716 | W | 720 | W |
| 800 | M | 800 | M |
| 958 | M | — | — |
| 1093 | Vs | 1095 | Vs |
| 1228 | S | 1230 | s |

The wave number value may vary by ± 2 cm$^{-1}$
[a]R.I: Relative Intensity, vs: very strong, s: strong, m: medium, w: weak.

This band is not observed in case of silicalite-1 and oxides of titanium (Rutile, Anatase) and alkaline titanates. A linear correlation is observed in the ratio of the intensity of 958 cm$^{-1}$ band and that of 800 cm$^{-1}$ band with the titanium content in the silicate.

The unit cell parameters of the titanium silicalite of the present invention containing varying amounts of titanium in the range of x=0.001 to 0.06, where x denotes the stoichiometry of titanium as given by the formula x TiO$_2$:SiO$_2$, are in the Table 3.

TABLE 3

| | X | Unit cell volume (A$^0$) | R[a] |
|---|---|---|---|
| Silicalite-1 | 0.000 | 5344.7 | — |
| Ti-Silicate | 0.009 | 5341.3 | 0.22 |
| Ti-Silicalite-1 | 0.023 | 5358.4 | 0.46 |
| Ti-Silicalite-1 | 0.056 | 5371.2 | 0.58 |

[a]Ratio of 958 cm$^{-1}$/800 cm$^{-1}$ IR band.

The scanning electron micrographs of the materials by the process of the present invention were taken on JEOL JSM 5200 instrument. SEM photograph show that the crystallite size distribution fall within the narrow range of 2 to 8 μm and are spheroidal in shape. The absorption capacities of calcined forms of the material of the present invention determined gravimetricary using a conventional Mc Bain balance at 298 K and P/Po=0.5 for cyclohexane water and n-hexane were found to be 7.2%, 7.1% and 11.6% (wt/wt) respectively. The adsorption studies demonstrate the absence of amorphous material occluded within the pores the titanium silicate of the present invention. Tho-ugh the catalyst composite material obtained may be used directly as a catalyst, it is desirable in various applications, to enhance the mechanical strength and ease of handling by admixing it with a suitable binder material and converting it into a suitable shape such as cylindrical extrudates, spheres, etc. silica, alumina, clay minerals such as bentonite, kaolinite or are thereof are suitable binder materials which impart improved mechanical strength to the Titanium Silicate catalyst composite material.

The novelty of the present invention lies in the use of ethyl silicate-40 and titanium peroxide as a source of silicon and titanium, which makes this process of gel preparation very simpler and highly cost effective as compared to the prior art processes where costly silicon tetra ethoxide and titanium tetra ethoxide are used as a source of silicon and titanium and special precautions are to be taken while carrying out gel preparation.

Titanium Silicate and its composite material prepared by the process of the present invention is useful as a catalyst in various hydrocarbon conversion reactions such as 1) oxidation of hydrocarbons or derivatives of hydrocarbons 2) Ammoxidation of ketones, aldehydes, and 3) oxidation of organic sulphides, amines etc.

The practice of the present invention is flirter illustrated by the following examples, which should not be construed to limit the scope of the present invention, in any manner

EXAMPLE 1

This example illustrates the preparation of Titanium Silicate using hydrothermal gel with following molar composition.

SiO$_2$; 0.03 TiO$_2$; 0.06 TPAOH:40 H$_2$O.

1.2 g of titanium tetrabutoxide is taken in polypropylene beaker and was hydrolyzed with 25 ml of deionized water. The resulting titanium hydroxide was reacted with 10 g of hydrogen peroxide (50%) forming an orange yellow colored clear solution of titanium peroxide. The titanium peroxide solution was added slowly to 15 g of ethylsilicate-40 with vigorous stirring. A yellowish white viscous gel is formed to which 6.5 g of tetrapropyl ammonium hydroxide (20% aqueous solution) was added to the above solution. The yellowish white gel turned to greenish white to which 72 g of deionised water is added to the above solution and stirred well for another one hour. The solution thus obtained is transferred into a stainless steel autoclave and kept for crystallization under static conditions at 170±1° C. for 3 days. After complete crystallization, the autoclave is quenched in icecold water. The contents are fitered/centrifuged, washed thoroughly with deionised water and dried at 110° C. for 4 hours and further calcined at 550° C. in a flow of air for 10 hrs. The XRD and IR data of the sample is given in Table 1 and Table 2 respectively. The molar composition of the organic free calcined material was 0.03TiO$_2$:0.97SiO$_2$.

EXAMPLE 2

This example illustrates the preparation of titanium rich titanium silicalite, using gel with the following molar composition.

SiO$_2$:0.05TiO$_2$:0.1 R$_4$NOH:55 H$_2$O 2.0 g. of titanium tetrabutoxide is taken in polypropylene beaker and was hydrolyzed with 25 ml of deionized water. The resulting titanium hydroxide was reacted with 10 g of hydrogen peroxide (50%) forming an orange yellow colored clear solution of titanium peroxide. The titanium peroxide solution was added slowly to 15 g of ethylsilicate-40 with vigorous stirring. A yellowish white viscous gel is formed to which 10 g of tetrapropyl ammonium hydroxide (20% aqueous solution) was added to the above solution. The yelowish white gel turned to greenish white to which 100 g of deionised water is added to the above solution and stirred wet for another one hour. The clear solution thus obtained is transferred into a stainless steel autoclave and kept for crystallization under static conditions at 170±1° C. for 3 days. After complete crystallization, the autoclave is quenched in icecold water. The contents are filtered/centrifuged, washed thoroughly with deionised water and dried at 110° C. for 4 hours and further calcined at 550° C. in a flow of air for 10 hrs. The molar composition of the organic free calcined material was 0.05TiO$_2$:0.95SiO$_2$. The remaining procedure was same as given in example 1.

EXAMPLE 3

This example illustrates the preparation of titanium containing silicate-1 using the gel having the following molar composition.

$SiO_2$:0.03 $TiO_2$:0.06 $R_4NOH$:40 $H_2O$ 1.2 g of titanium tetrabutoxide is taken in polypropylene beaker and was hydrolyzed with 25 ml of deionized water. The resulting titanium hydroxide was reacted with log of hydrogen peroxide (50%) forming an orange yellow colored clear solution of titanium peroxide. The titanium peroxide solution was added slowly to 15 g of ethylsilicate-40 in isopropyl alcohol as a solvent with vigorous stirring. A yellowish white viscous gel is formed to which 6.5 g of tetrapropyl ammonium hydroxide (20% aqueous solution) was added to the above solution. The yellowish white gel turned to greenish white to which 72 g of deionised water is added to the above solution and stirred well for another one hour. The clear solution thus obtained is transferred into a stainless steel autoclave and kept for crystallization under static conditions at 170±1° C. for 3 days. After complete crystallization, the autoclave is quenched in icecold water. The contents are filtered/centrifuged, washed thoroughly with deionised water and dried at 110° C. for 4 hours and further calcined at 550° C. in a flow of air for 10 hrs. The molar composition of the organic free calcined material was 0.03$TiO_2$:0.97$SiO_2$. The remaining procedure was same as given in example 1.

EXAMPLE 4

This example illustrates the catalytic activity of the TS-1 in the hydroxylation of phenol to catechol and hydroquinone, using hydrogen peroxide as oxidant. 1 gram of Titanium silicate obtained according to example 1 is taken in a reaction vessel (R.B.flask), 10 grams of phenol and 100 grams of water is added to the catalyst. 2.26 grams of $H_2O_2$ (30% aqueous soln.), is added dropwise to the reaction mixture under stirring. The temperature of the reaction mixture is maintained at 75° C. The reaction is continued for four hours. The reaction mixture is centrifuged to remove the catalyst and the solvent is distilled off under vacuum. The product contained catechol and hydroquinone in 1:1.5 mole ratio and para-benzoquinone is also detected in small amount. Results are recorded in the table 4 below.

TABLE 4

Reaction temperature: 75° C., Phenol/$H_2O_2$ mole ratio: 5,
Solvent: Water, Reaction time: 4 hours, Phenol/catalyst: 10 wt %

| Conversion of Phenol | Selectivity % | | |
|---|---|---|---|
| (% Theoretical) | p-Benzoquinone | Catechol | Hydroquinone |
| 93 | 2 | 39 | 59 |

The advantages of the present invention are
1. With the use of ethyl silicate-40 and titanium peroxide as silicon and titanium source, the processing of gel preparation is sampler as compared to the prior art processes where special precautions are to be taken while carrying out gel preparation.
2. By the process of the present invention titanium rich titanium silicate can be prepared with comparable catalytic activity with TS-1 prepared using prior art.
3. The process is highly cost effective.

We claim:

1. A process for preparation of microporous, crystalline titanium silicate having a silicalite-1 structure and a chemical composition of formula $xTiO_2$:(1–x) $SiO_2$ wherein x is in the range of 0.001 to 0.05, which comprises:
   a) adding a solution of titanium peroxide as a titanium source to ethyl silicate with or without an organic solvent to obtain a homogenous gel,
   b) hydrolyzing the homogeneous gel obtained in step (a) by adding an organic base to the above said resultant gel with silica to organic base ratio in the range of 1:0.06 to 0.15 followed by adding deionised water when yellow white gel turns into greenish white gel,
   c) stirring the above greenish white gel for about 1 hr,
   d) heating the stirred greenish white gel at autogenous pressure, at a temperature in the range of 100 to 110° C. for a period of 1–4 days to obtain a solid composite material, separating the resultant solid composite material, drying and calcining the resultant solid composite material at a temperature in the range of 350–550° C. in the presence of air to obtain the desired product.

2. A process as claimed in claim 1 wherein the organic base comprises aqueous tetrapropyl ammonium hydroxide (TPAOH).

3. A process as claimed in claim 1 wherein the ethyl silicate is used as a source of silicon oxide.

4. A process as claimed in claim 1 wherein the ethyl silicate used is ethyl silicate 40.

5. A process as claimed in claim 4 wherein the ethyl silicate 40 used is a condensed product of orthosilicate selected from the group consisting of tetramer, pentamer and hexamer.

6. A process as claimed in claim 1 wherein the organic solvent used is an alcohol with 2 to 5 carbon atoms.

7. A process as claimed in claim 6 wherein the alcohol is selected from the group consisting of ethyl, propyl and butyl.

8. A process as claimed in claim 1 wherein the silica to TPAOH ratio used is 1:0.1.

9. A process as claimed in claim 1 wherein the starting mixture has a chemical molar composition of 0.0.6-$R_4N^+OH$:0.001–0.05$TiO_2$:–$SiO_2$:25–55 $H_2O$ where R is a propyl group.

* * * * *